United States Patent [19]

Vanderlaan et al.

[11] Patent Number: 4,672,992

[45] Date of Patent: * Jun. 16, 1987

[54] DIRECT DRIVE VALVE-BALL DRIVE MECHANISM

[75] Inventors: Robert D. Vanderlaan; John W. Meulendyk, both of Kalamazoo, Mich.

[73] Assignee: Pneumo Corporation, Boston, Mass.

[*] Notice: The portion of the term of this patent subsequent to Mar. 4, 2003 has been disclaimed.

[21] Appl. No.: 830,918

[22] Filed: Feb. 19, 1986

Related U.S. Application Data

[63] Continuation of Ser. No. 682,536, Dec. 17, 1984, abandoned.

[51] Int. Cl.$^4$ ............................................. F16K 31/52
[52] U.S. Cl. ..................................... 137/331; 251/58; 251/129.11; 251/229; 251/251; 74/22 R; 74/49
[58] Field of Search ...................... 74/22 R, 49, 50; 137/331, 625.64, 625.65; 251/258, 260, 129.11, 58, 229, 251

[56] References Cited

U.S. PATENT DOCUMENTS

| 544,727 | 8/1895 | Gilcher | 251/260 |
|---|---|---|---|
| 1,736,974 | 11/1929 | King | 74/49 |
| 2,833,508 | 5/1958 | Bydalek et al. | 251/133 |
| 3,259,076 | 7/1966 | Halberg et al. | 74/49 |
| 3,550,631 | 12/1970 | Vanderlaan et al. | 137/625.65 |
| 3,774,632 | 11/1973 | Mrugala | 251/260 |
| 4,176,687 | 12/1979 | Ensign | 137/625.65 |
| 4,436,163 | 3/1984 | Simpson | 74/22 R |
| 4,573,494 | 3/1986 | Spurbeck | 251/129.11 |

Primary Examiner—Margaret A. Focarino
Assistant Examiner—Noah Kamen
Attorney, Agent, or Firm—Renner, Otto, Boisselle & Lyon

[57] ABSTRACT

Ball drive mechanism includes a ball-like member on an eccentric output shaft of a rotary force motor which is received in a transversely extending cylindrical socket on a valve member. The outer diameter of the ball-like member is substantially the same as the inner diameter of the cylindrical socket to provide line contact therebetween at some distance radially offset from the longitudinal axis of the valve member which is at least as great as the eccentric offset, whereby the rotary output of the rotary force motor is translated into both linear and rotary movement of the valve member.

10 Claims, 4 Drawing Figures

DIRECT DRIVE VALVE-BALL DRIVE MECHANISM

This application is a continuation of application Ser. No. 682,536, filed 12-17-84, now abandoned.

This invention relates generally as indicated to a direct drive valve-ball drive mechanism and more particularly to a novel drive connection between a rotary force motor and a valve member or the like for translating the rotary output of the motor to both linear and rotary movement of the valve member.

In certain types of high pressure fluid proportional servo control systems such as a control actuation system for aircraft in which the fluid pressure may for example be on the order of 1,000 psi or more, it has been found advantageous to use a direct drive valve of relatively short stroke. The present invention relates to a novel drive mechanism for directly driving the valve member by a rotary force motor.

In accordance with this invention, a ball-like member on the outer end of an eccentric output shaft of a rotary force motor is received in a transversely extending cylindrical socket in the valve member. The eccentric output shaft rotates about a center line that is substantially perpendicular to the center line of the valve member and has an eccentric offset that provides the gearing to transfer a relatively large motor angular rotation into a relatively short valve motion. The outer diameter (OD) of the ball-like member is slightly less than the inner diameter (ID) of th cylindrical socket to provide line contact therebetween at some distance radially offset from the longitudinal axis of the valve member which is at least as great as the eccentric offset, whereby the rotary output of the motor is translated into both linear and rotary movement of the valve member.

In accordance with another aspect of the invention, preferably the ball-like member is rotatably mounted on the eccentric output shaft of the rotary force motor to provide for bearing redundancy in the event that the ball-like member becomes locked up or otherwise jammed within the cylindrical socket.

To the accomplishment of the foregoing and related ends, then, the invention, then, comprises the features hereinafter fully described and particularly pointed out in the claims, the following description and the annexed drawings setting forth in detail certain preferred embodiments of the invention, these being indicative, however, of but several of the various ways in which the principles of the invention may be employed.

DETAILED DESCRIPTION OF THE PREFERRRED EMBODIMENTS

Figure 1:
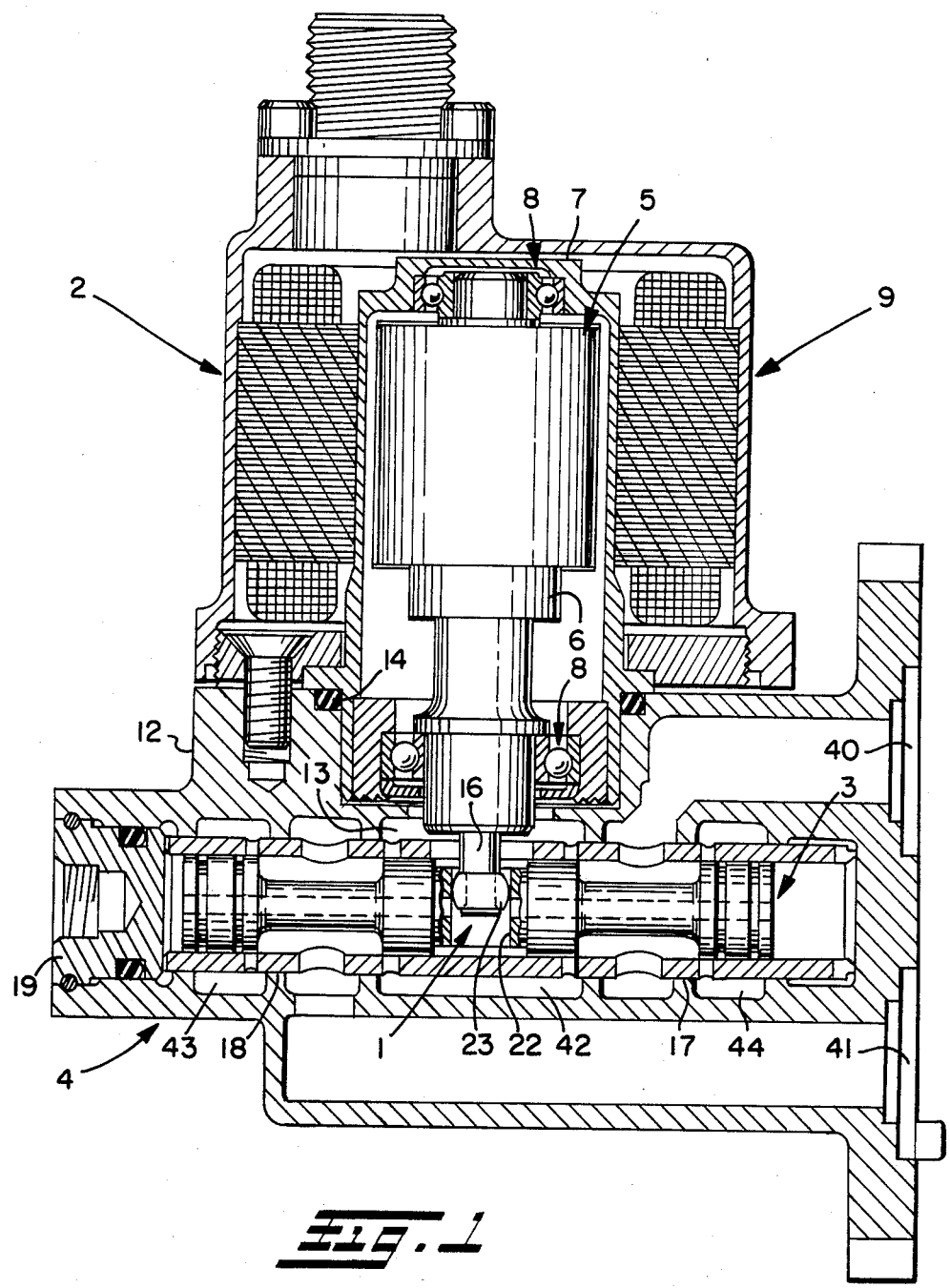
FIG. 1 is a partial longitudinal section through a direct drive valve and force motor assembly shown directly connected together by a preferred form of ball drive mechanism in accordance with this invention.

Referring now in detail to the drawings and initially to FIG. 1, there is shown a preferred form of drive mechanism 1 in accordance with this invention providing a drive connection between a rotary force motor 2 and the valve member 3 of a valve assembly 4 to which the motor is connected. Preferably, such rotary force motor is a non-commutated two pole stationary coil magnet motor which may be of the type disclosed, for example, in copending U.S. application Ser. No. 482,769, entitled "Limited Angle Torque Motor", filed Apr. 7, 1983, now U.S. Pat. No. 4,533,891, dated Aug. 6, 1985, which is incorporated herein by reference. Such motor includes a rotor assembly 5 having a rotor shaft 6 journal mounted within a rotor casing 7 adjacent opposite ends thereof as by rotor shaft bearings 8 suitably supported by common casing structure, and a stator and housing assembly 9 surrounding the rotor casing.

The rotor casing 7 may be clamped or otherwise secured to the housing 12 of the valve assembly 4 in such a manner that the rotor casing extends into a cavity 13 in the valve housing to expose the interior of the rotor casing to the fluid pressure within the valve housing. This provides the advantages of a wet motor design, including eliminating the need for a dynamic shaft seal and providing a lubricating fluid for the rotor bearings. A static seal 14 may be provided between the rotor casing 7 and valve housing to keep the stator and housing assembly 9 dry thus allowing replacement of the stator and housing assembly without disturbing the rotor casing and rotor assembly.

The rotary force motor has an eccentric output shaft 16 which extends perpendicularly into a longitudinal bore 17 in the valve housing 12. Contained within such bore is a valve sleeve 18 which may be held against movement within the bore as by means of a closure member 19 suitably retained in the outer end of the bore. Within the valve sleeve 18 is the valve member 3 which is axially movable therein. The drive mechanism 1 includes a ball-like member 23 on the outer end of the eccentric shaft 16 which is received in a transversely extending cylindrical socket 22 in the valve member 3. The ball-like member 23 has an OD which is slightly less than the ID of the cylindrical socket 22 to provide line contact therebetween.

Figure 2:
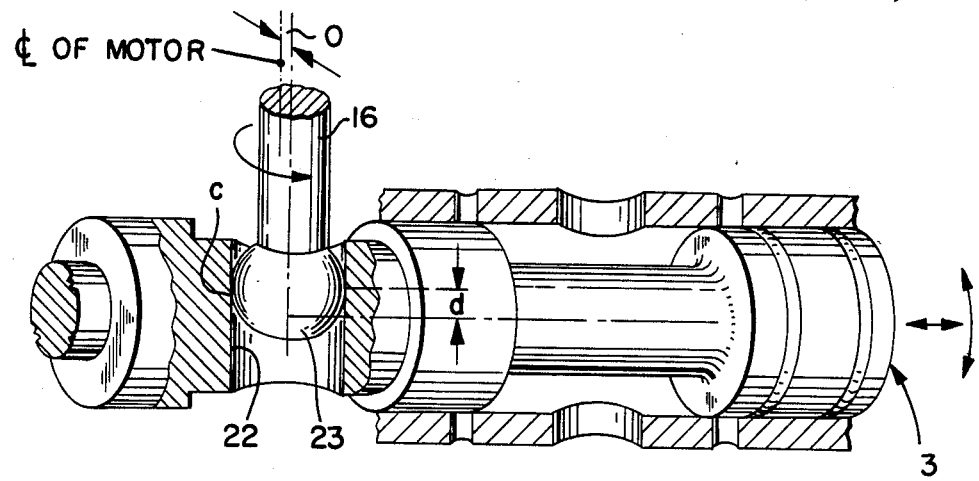
FIG. 2 is an enlarged fragmentary longitudinal section showing the drive connection between the motor output shaft and valve member.
Figure 3:
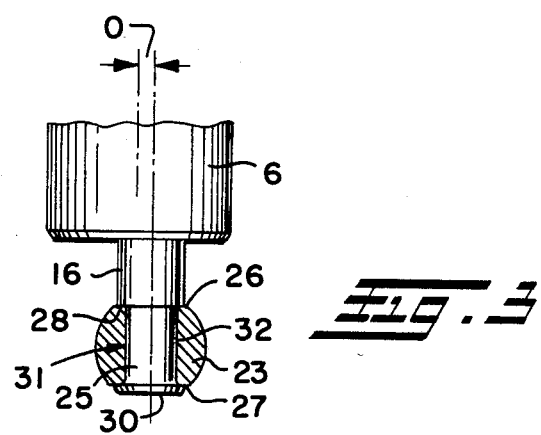
FIG. 3 is an enlarged fragmentary side elevation view, partly in section, showing a separate ball-like member rotatably mounted on the outer end of the motor output shaft.

As best seen in FIGS. 2 and 3, the eccentric shaft 16 rotates about the center line of the motor which is 90° to the center line of the valve member 3 and has an eccentric offset o that provides the gearing to transfer a relatively large motor angular rotation into a relatively short valve motion. During such rotation of the eccentric shaft 16, the shaft produces one force component acting on the valve member causing the valve member to move linearly and another force component acting in a direction transverse to the first force component and perpendicular to the axis of the eccentric shaft. This second force component may be effectively utilized to cause limited rotation of the valve member during linear movement thereof to assist in overcoming both sliding friction and any chip shear forces that may be encountered during such valve movement. This is accomplished by radially offsetting the line of contact c of the ball member 23 with the cylindrical socket 22 from the longitudinal axis of the valve member a distance d (see FIG. 2) which is at least as great as the eccentric offset o of the eccentric shaft 16 relative to the center line of the motor 2 and preferably two or more times such eccentric offstet.

If desired, the ball member 23 may be made integral with the eccentric shaft 16. However, preferably such ball member comprises a separate spherical bearing member which is rotatably mounted on the eccentric shaft to provide for bearing redundancy. As best seen in FIG. 3, the outer end of the eccentric shaft 16 may have a reduced diameter hub portion 25 for receipt of the spherical bearing member 23 thereon. Also, the ends of the spherical bearing member are desirably truncated to provide flat ends 26, 27, one such end 26 being engageable with a shoulder 28 adjacent the inner end of the hub portion 25 to prevent movement of the spherical bearing member inwardly beyond that point, and the other end 27 being engageable by a flanged or enlarged outer end 30 on such hub portion to retain such spherical bearing member on such hub portion.

When such a separate spherical bearing member 23 is provided on the eccentric shaft 26, such shaft is still free to turn relative to the valve member 3 even if a chip or the like should cause the spherical bearing member to lock up or otherwise become jammed within the cylindrical socket 22. In that event, a secondary bearing 31 (FIG. 3) defined by the OD of the eccentric shaft 16 and ID of the spherical bearing member 23 will provide the required bearing structure to permit the eccentric shaft to rotate freely relative to the spherical bearing member. Also, a low friction coating 32 such as polyimide or Teflon may be provided on the OD of the hub portion 25 or ID of the spherical bearing member 23 to minimize the friction therebetween.

Figure 4:
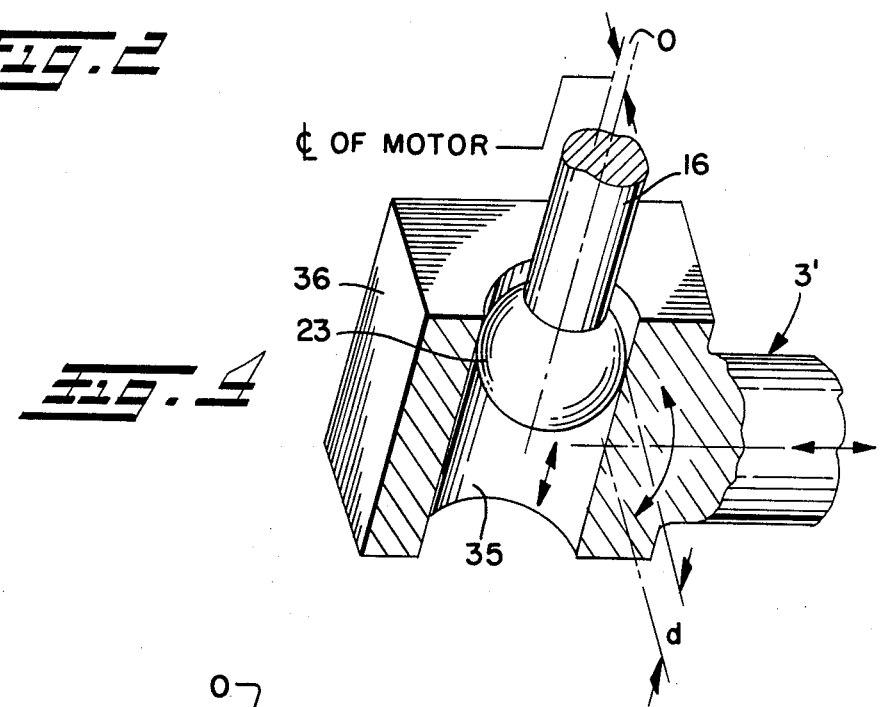
FIG. 4 is an enlarged fragmentary perspective view, partially broken away to show an enlarged end on a valve member having a cylindrical socket therein for receipt of such ball-like member.

The cylindrical socket 22 may be located intermediate the ends of the valve member 3 as shown in FIGS. 1 and 2, or a cylindrical socket 35 similar to the socket 22 may be provided in an enlarged extension 36 on the outer end of the valve member 3' as shown in FIG. 4. In either case, the 90° center line relationship between the rotary force motor 2 and valve member 3 eliminates adverse effects (i.e., null shifts) of return pressure variations as well as motor shaft end play, shock, vibration, and thermal dimensional changes within the motor. Also, such a 90° center line relationship between the motor and valve member has the advantage that the motor may readily be connected and/or disconnected from the valve member by a simple pushing or pulling motion without requiring a lock of any sort therebetween.

The offset o of the motor eccentric 16 provides the necessary gearing to transfer a relatively large motor angular rotation into a relatively short valve motion without the minmum practical offset limitations that exist in the straight rotary to rotary motion. Also, such a drive connection greatly reduces the effect of any unbalanced valve member masses and/or flow forces being reflected back to the motor and allows for easy mass balancing within the motor.

The input to the motor 2 itself may be controlled by command signals received from control augmentation system electronics and the like to serve as a control input to the valve member 3. Also, system redundancy may be accomplished by providing multiple parallel coils within the motor, whereby if one coil or its associated electronics should fail, its counterpart channel will maintain control by equalizing the failed channel force effect. The ability to sense which channel has failed may be provided for in the failure monitoring electronics such that when detected, the failed channel is decoupled and made passive.

When the valve member 3 is in the valve null position shown in FIG. 1, fluid flow to and from the cylinder ports 40, 41 is blocked. Controlled selected movement of the valve member by the rotary force member 2 will cause the valve member to move out of the null position respectively to connect one of the cylinder ports 40, 41 to a system supply pressure groove 43 or 44 in the valve housing 12 and the other cylinder port to the system return pressure groove 42.

From the foregoing, it will now be apparent that the ball drive mechanism of the present invention provides a very simple and effective means for translating the rotary output of a rotary force motor to both linear and rotary movement of a valve member or other such mechanism driven thereby.

Although the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the claims.

The embodiments of the invention in which an exclusive property or privilege is claimed are defined as follows:

1. In combination, a valve assembly comprising a valve housing containing a longitudinal bore, and a valve member movable in said bore, a rotary force motor, and drive means between said rotary force motor and valve member for translating the rotary output of said rotary force motor to movement of said valve member within said bore, said drive means comprising an eccentric shaft rotatably driven by said force motor, said eccentric shaft being radially offset relative to the centerline of said force motor, said eccentric shaft extending substantially perpendicular to the longitudinal axis of said valve member, said valve member having a transversely extending cylindrical socket in which said eccentric shaft is received, said eccentric shaft having a ball-like member thereon, the outer diameter of said ball-like member being slightly less than the inner diameter of said cylindrical socket to prvoide line contact with a cylindrical wall portion of said cylindrical socket substantially completely around the entire inner diameter of said cylindrical socket, said line contact between said ball-like member and said cylindrical wall portion of said cylindrical socket being radially outward of the longitudinal axis of said valve member and radially inward of the outer diameter of said valve member and the inner diameter of said bore whereby the rotary output of said motor is translated into both linear and rotational movement of said valve member within said bore.

2. The combination of claim 1 wherein the radial offset of said line contact between said ball-like member and said cylindrical wall portion of said cylindrical socket is at least twice the radial offset of said eccentric shaft relative to the center line of said motor.

3. The combination of claim 1 wherein said line contact between said ball-like member and said cylindrical wall portion of said cylindrical socket is radially offset with respect to the longitudinal axis of said valve member a distane at least as great as the radial offset of said eccentric shaft relative to the center line of said motor.

4. The combination of claim 1 wherein said valve member has an extension on one end containing said cylindrical socket.

5. The combination of claim 1 wherein said ball-like member comprises a spherical bearing member rotatably mounted on said eccentric shaft.

6. The combination of claim 5 wherein said eccentric shaft has a reduced diameter hub portion on the outer end thereof on which said spherical bearing member is rotatably mounted.

7. The combination of claim 6 wherein said spherical bearing member is truncated to provide flat ends, one of said ends being engageable with a shoulder adjacent the inner end of said hub portion, and means are provided on the outer end of said hub portion for retaining said spherical bearing member on said hub portion.

8. In combination, a valve assembly comprising a valve housing containing a longitudinal bore, and a valve member movable in said bore, a rotary force motor, and drive means between said rotary force motor and valve member for translating the rotary output of said rotary force motor to movement of said valve member within said bore, said drive means comprising an eccentric shaft rotatably driven by said force motor, said eccentric shaft being radially offset relative to the centerline of said force motor, said eccentric shaft extending substantially perpendicular to the longitudinal axis of said valve member, said valve member having a transversely extending cylindrical socket in which said eccentric shaft is received, said eccentric shaft having a ball-like member thereon, the outer diameter of said ball-like member being slightly less than the inner diameter of said cylindrical socket to provide line contact with a cylindrical wall portion of said cylindrical socket substantially completely around the entire inner diameter of said cylindrical socket, said line contact between said ball-like member and said cylindrical wall portion of said cylindrical socket being radially outward of the longitudinal axis of said valve member and radially inward of the outer diameter of said valve member and the inner diameter of said bore whereby the rotary output of said motor is translated into both linear and rotational movement of said valve member within said bore, said ball-like member comprising a spherical bearing member rotatably mounted on said eccentric shaft, said eccentric shaft having a reduced diameter hub portion on the outer end thereof for receipt of said spherical bearing member, said spherical bearing member having flat ends which are respectively engageable with a shoulder adjacent the inner end of said hub portion and a flanged end on the outer end of said hub portion for rotatably mounting said spherical bearing member on said hub portion.

9. The combination of claim 8 further comprising a low friction coating between the engaging surfaces of said spherical bearing member and eccentric shaft.

10. The combination of claim 9 wherein the radial offset of said line contact between said spherical bearing member and said cylindrical wall portion of said cylindrical socket is greater than the offset of said eccentric shaft relative to the center line of said motor.

* * * * *